US012710007B1

(12) United States Patent
Tanis et al.

(10) Patent No.: US 12,710,007 B1
(45) Date of Patent: Aug. 18, 2026

(54) CONTROL OF VARIABLE GEOMETRY TURBOCHARGERS

(71) Applicant: Caterpillar Inc., Peoria, IL (US)

(72) Inventors: Derek A. Tanis, Peoria, IL (US); Kevin Weiss, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/053,954

(22) Filed: Feb. 14, 2025

(51) Int. Cl.
*F02B 37/24* (2006.01)
*F02D 23/00* (2006.01)

(52) U.S. Cl.
CPC .............. *F02B 37/24* (2013.01); *F02D 23/00* (2013.01)

(58) Field of Classification Search
CPC ................................ F02B 37/22; F02B 37/24
See application file for complete search history.

(56) References Cited

U.S. PATENT DOCUMENTS 9,096,221 B2 8/2015 Kim
9,677,486 B2 6/2017 Kees et al.
11,654,885 B2 5/2023 Jun et al.
11,674,461 B2 6/2023 Kurtz et al.
2008/0127643 A1* 6/2008 Leustek .................. F02B 37/16 123/559.1
2015/0240708 A1 8/2015 Kostrzewski
2023/0139973 A1* 5/2023 Kurtz ...................... F02D 41/12 123/568.21
2023/0150502 A1 5/2023 Dickson et al.

FOREIGN PATENT DOCUMENTS

DE 102014225763 A1 6/2015
DE 202014009074 U1 2/2016
DE 102020122889 A1 3/2021
KR 102237073 B1 4/2021
WO 2022039903 A1 2/2022

OTHER PUBLICATIONS

Extended European search report for EP Patent Appln. No. 26153651, mailed Jun. 26, 2026 (8 Pgs).

* cited by examiner

*Primary Examiner* — Ngoc T Nguyen

(57) ABSTRACT

Systems, methods, and computer-program products can pertain to a variable geometry turbocharger (VGT) control and can comprise: determining using a processor, whether a coast flag is set indicating that a work machine is coasting; holding the VGT at a current vane configuration as long as the coast flag is set; and returning the VGT to normal operation thereof upon a determination that the coast flag is reset.

17 Claims, 7 Drawing Sheets

CONTROL OF VARIABLE GEOMETRY TURBOCHARGERS

TECHNICAL FIELD

The present disclosure relates to control of variable geometry turbochargers (VGTs).

BACKGROUND

Variable geometry turbochargers (VGTs) are devices that modulate intake air density into an internal combustion engine based on engine speed. VGTs have both a turbine and air compressors like fixed vane turbochargers, but have displaceable vanes in the turbine that modulate the incoming exhaust to achieve a desired rotational speed of the compressor. The displaceable vanes define a VGT configuration for a given engine speed. However, operating the displaceable vanes causes wear that can reduce the efficiency and useful lifetime of the VGT. Such wear may be ameliorated by minimizing large swings in the vane configuration that occur when the vehicle in which the VGT is installed is coasting.

US Patent Application Publication 2023/0150502 ("the '502 publication") describes an apparatus that receives look ahead information and stores the look ahead information in one or more memory devices. A processor receives vehicle information regarding the operation of a vehicle including the engine. The processor determines a coasting opportunity for the vehicle based on the look ahead information and the vehicle information. The processor modulates a cruise control set speed based on the determined coasting opportunity and turns the engine off during the determined coasting opportunity for the vehicle based on modulation of the cruise control set speed. Notably, the '502 publication is understood to use "look ahead data" to plan a time when the vehicle can coast with the engine off.

Engineering and product development resources continue to seek opportunities to reduce the wear and other damage of the VGT.

SUMMARY

In one aspect of the present inventive concept, a work machine includes an internal combustion engine; and a variable geometry turbocharger (VGT) constructed to modulate intake air density of the internal combustion engine. Control circuitry may determine whether the work machine is coasting without use of look-ahead data. The control circuitry further asserts a coasting flag upon a determination that the work machine is coasting. The control circuitry outputs control signaling to maintain a current VGT vane configuration as long as the coasting flag is asserted.

In another aspect of the present inventive concept, an internal combustion engine of a work machine includes a variable geometry turbocharger (VGT) constructed to modulate intake air density of the internal combustion engine. Electronic machine control circuitry asserts a coasting flag upon a determination that the work machine is coasting. VGT control circuitry maintains a current VGT vane configuration as long as the coasting flag is asserted.

In yet another aspect of the present inventive concept, a method of variable geometry turbocharger (VGT) control includes determining, in real time, using a processor, whether a coast flag is set indicating that a work machine is coasting. The VGT is held at a current vane configuration as long as the coast flag is set and returned to normal operation upon a determination that the coast flag is reset.

DESCRIPTION OF EXAMPLE EMBODIMENTS

Figure 1:
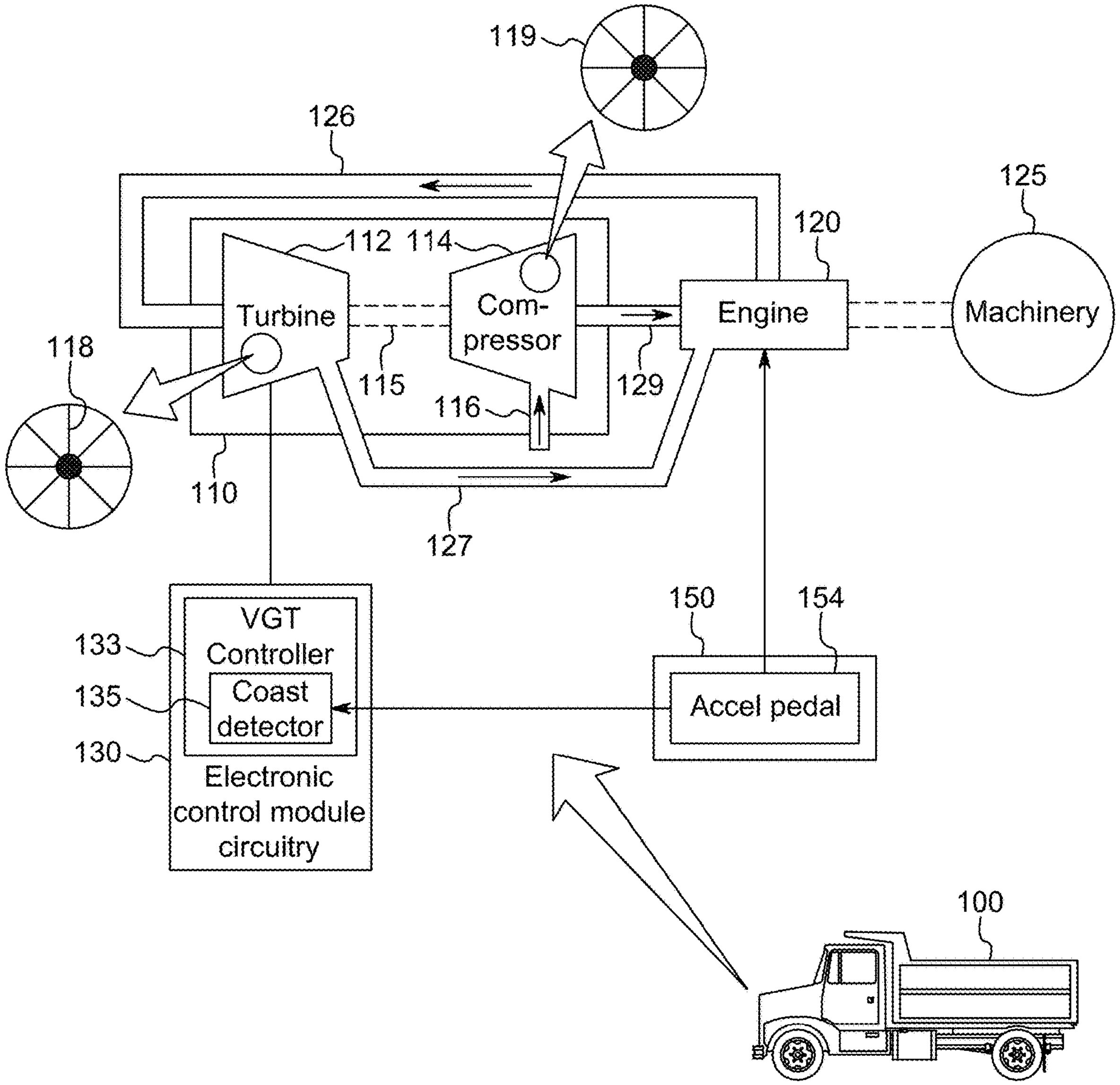
FIG. 1 is a schematic block diagram of an exemplary work machine in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 is a schematic block diagram of an exemplary work machine 100 in which the present inventive concept can be embodied. The inventive concept described herein may be applied to internal combustion engines of different types (e.g., gasoline engines, diesel engines, etc.), as will be appreciated by those skilled in the mechanical arts. Work machine 100 may include an engine 120, such as an internal combustion engine, that drives machinery 125, such as, for example, a drive train, pneumatic and/or hydraulic pumps for work tool operation, electrical generators, etc.

Engine 120 may include a variable geometry turbocharger (VGT) 110 constructed to modulate engine intake air density based on engine speed. To do so, VGT 110 may include a turbine 112 mechanically coupled to a compressor 114 through a common shaft 115. Turbine 112 may be inserted into an exhaust circuit, representatively illustrated at source exhaust conduit 126 and return exhaust conduit 127, by which VGT 110 derives operating power. Compressor 114 may be coupled to a charging air supply, such as ambient air, through an intake air port 116. The compressed air may be provided into intake manifold 129 of engine 120 at an intake air density that depends upon the rotational speed of the turbocharger's compressor wheel 119.

Turbine 112 may be equipped with a set of displaceable vanes, representatively illustrated at vane 118, that are positioned by a VGT controller 133. The position of vanes 118 within turbine 112 is referred to herein as a VGT configuration. Such VGT configuration controls the flow of gas (e.g., air) into engine 120 by changing the aspect ratio of vanes 118 to control the rotational rate of compressor 117. The VGT configuration may be selected through VGT controller 133. As illustrated in FIG. 1, VGT controller 133 may be embedded in other circuits, such as an electronic control module (ECM) 130 of work machine 100. That is, either or both VGT controller 133 and coast detector 135 may be realized in hardware and/or software of electronic control module circuitry 130.

Embodiments of the present inventive concept may be constructed to identify when work machine 100 is in a coasting mode. Such identification can be achieved by a suitable coast detector 135 in several ways, including by determining whether an accelerator pedal 154 in an operator cabin 150 is in a null position, i.e., not actuated by depression of the accelerator pedal 154. Additionally, or alternatively, identifying the coasting mode may be achieved by a state of engine 120, e.g., engine braking. It is to be understood that identifying the coasting mode may be achieved without receiving look-ahead information.

Figure 2A:
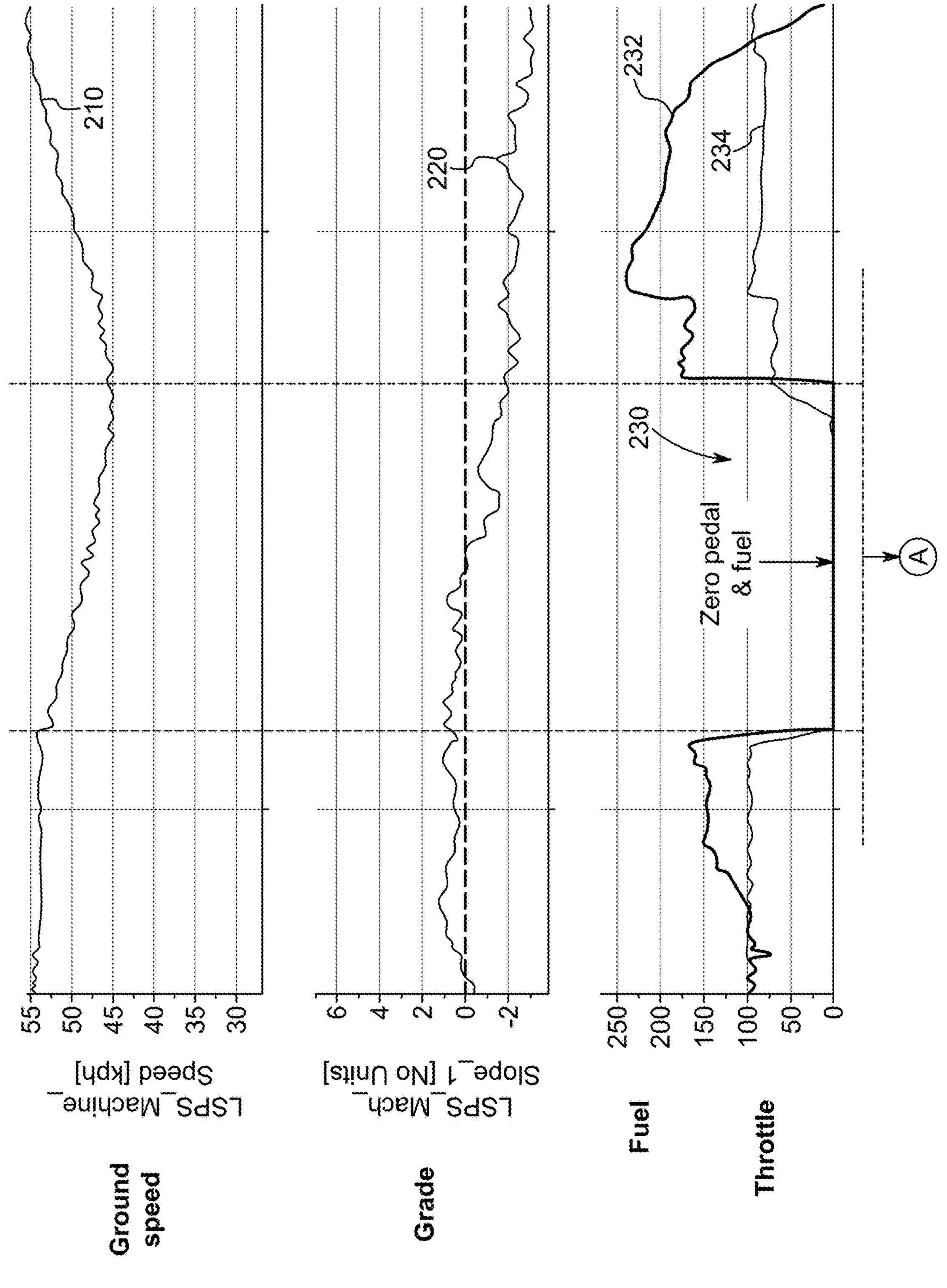
FIGS. 2A and 2B are a set of graphs by which VGT functionality of work machine is explained.
Figure 2B:
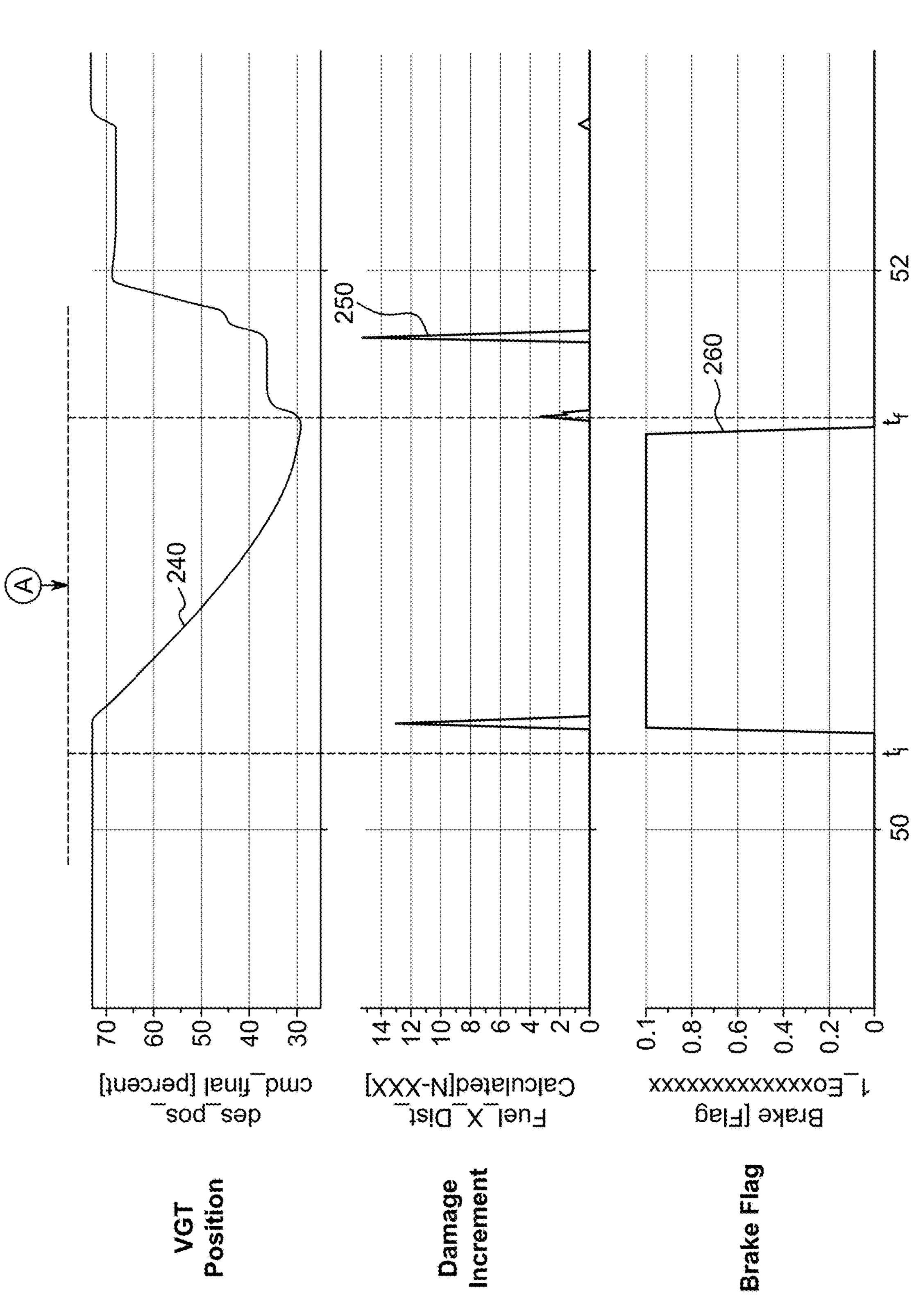

FIGS. 2A and 2B, collectively referred to herein as FIG. 2, are a set of graphs by which typical VGT functionality is explained. In the illustrated example, work machine 100 may traverse a ground path at a ground speed 210, with the ground path being inclined at grade 220, where negative grade refers to a downhill incline relative to motion of work machine 100. In the illustrated example, at time $t_i$, the operator may release accelerator pedal 154 to a null or zero position that corresponds to zero throttle 234 and zero fuel rate 232 thus defining a zero-throttle event 230 over the short-lived period $t_i$-$t_f$. In response, control circuitry aboard work machine 100, e.g., ECM circuitry 130, may activate engine braking as is indicated by a brake flag 260 and, consequently, ground speed 210 is reduced. The brake flag may, in certain embodiments, serve as a coasting flag. Additionally, in response to the zero-throttle event 230, VGT may be compelled, such as by VGT controller 133, to reconfigure its vanes 118 from a relatively open configuration to a relatively closed position, illustrated at time $t_f$.

Zero throttle event 230 may terminate in response to activation of throttle 234 and return of fuel flow 232. This may compel a reconfiguration of vanes 118 from a relative closed position to a relatively open position, as illustrated at VGT position signal 240. An increase in engine speed may be reflected in a corresponding increase in ground speed 210.

As illustrated in FIG. 2, changes in a VGT configuration 240 may incur a cost, as indicated at damage signal 250, where the magnitude of the damage signal 250 may represent an increment size in a damage parameter. Damage signal 250 may be generated after the fact by estimating the forces and relative motion between parts, such that higher force and larger motions incur a larger damage. The forces may be mathematically determined in the engine control module circuitry 130 using a combination of other engine sensors (e.g. intake manifold temp/pressure, engine speed, etc.) and mathematical models.

Returning to FIG. 1, a zero-throttle event 230 may be identified from the position of accelerator pedal 154 (or the throttle linkage or throttle sensor attached thereto) in operator cab 150 of work machine 100. Other techniques for determining throttle position may also be used. Such position may be provided to a coast detector 135 that identifies when work machine 100 is coasting. As will be discussed below, coast detector 135 may monitor different parameters and base its output, e.g., a coast flag, on those parameters meeting certain threshold conditions. When the coast flag is active, VGT controller 133 may freeze the VGT configuration, e.g., VGT vanes 118, at the configuration the VGT 110 was found when the coast flag first went active. This is referred to herein as a current VGT configuration. In certain embodiments, the coast flag may remain active as long as hold conditions are present.

Figure 3:
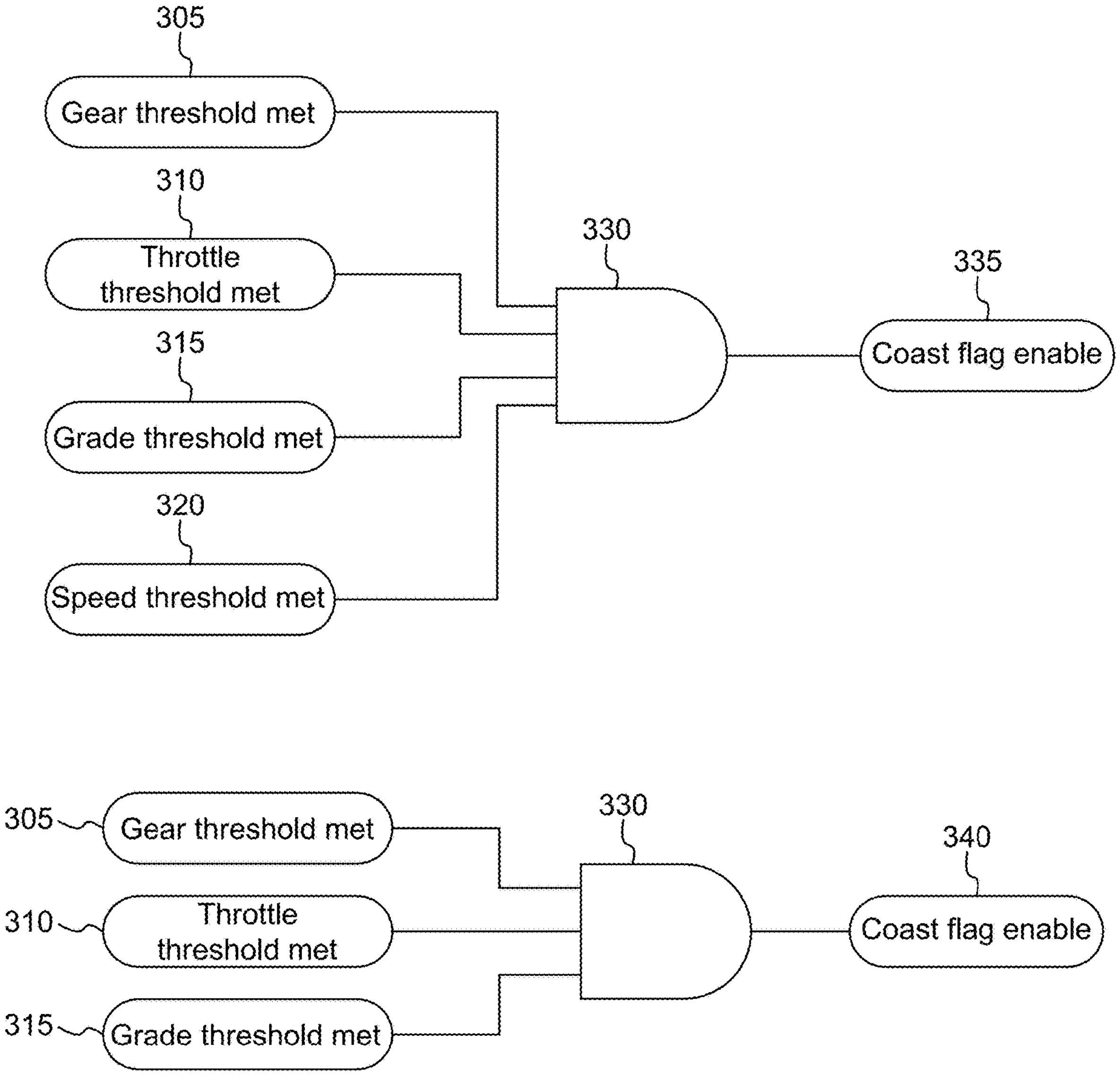
FIG. 3 is a schematic block diagram of an exemplary coast detector by which the present inventive concept can be embodied.

FIG. 3 is a schematic block diagram of an exemplary coast detector 300 by which the present inventive concept can be embodied. Here, coast detector 300 may implement an AND function 330 on a set of parameters. It may be determined, for example, whether a gear threshold 305, e.g., gear ≥3F, has been met, whether a throttle threshold 310, e.g., throttle <5%, has been met, whether a grade threshold 315, e.g., grade >−5% has been met and whether a vehicle speed threshold 320, e.g., vehicle speed ≥16 kph, has been met. Coasting may be enabled, as illustrated at coast flag enable 335, when the foregoing conditions have been met. The coast flag remains active, as illustrated at coast flag hold 340, as long as the gear threshold 305, the throttle threshold and grade threshold have been met. Coasting may be disabled when either the gear threshold 305, throttle threshold 310 or grade threshold 315 is no longer active. It is to be understood that parameters other than those described above to enable and/or to hold a state of the coast detector can be used to implement the present inventive concept.

Figure 4:
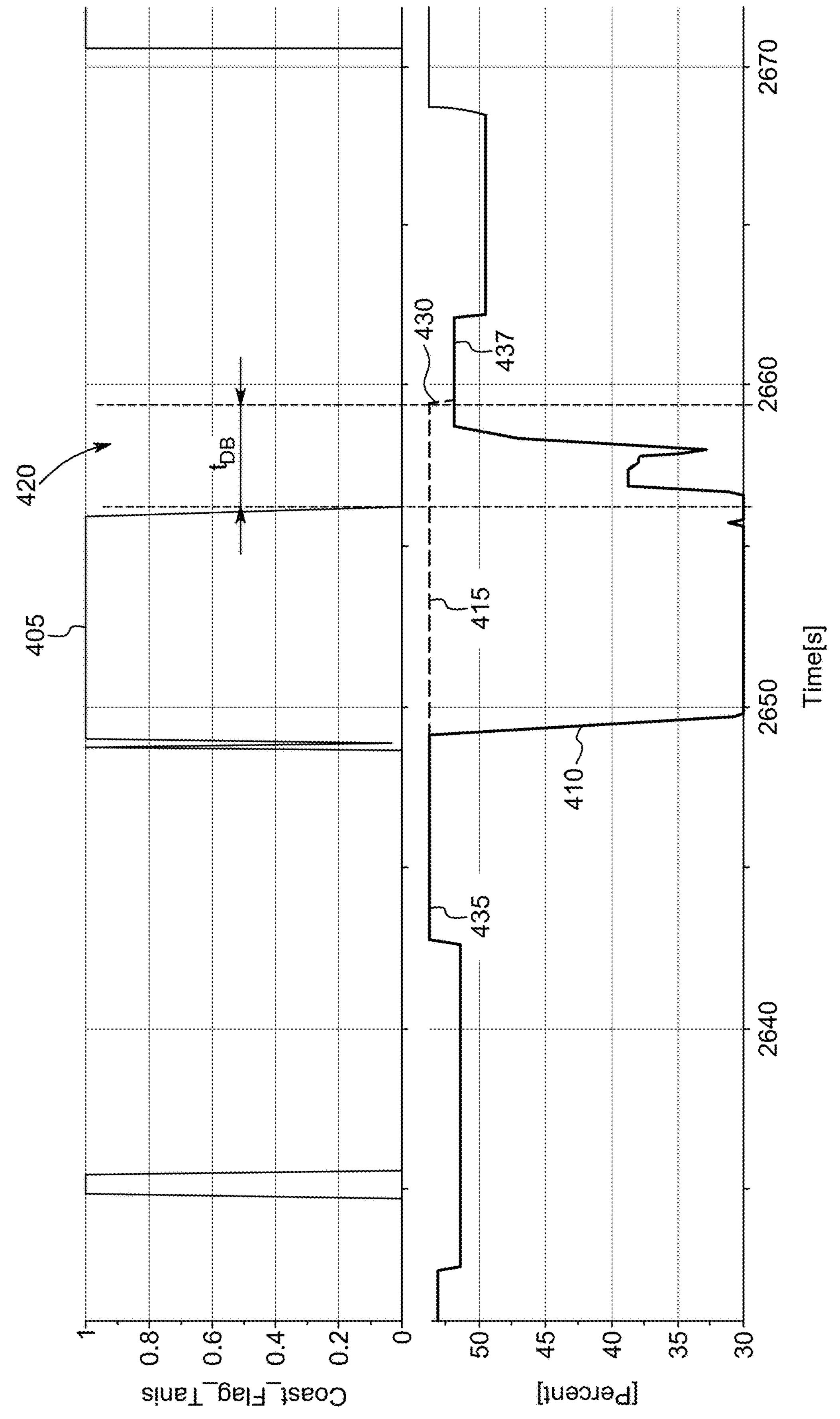
FIG. 4 is a graph depicting a coasting feature by which the present inventive concept can be embodied.

FIG. 4 is a graph depicting a coasting feature by which the present inventive concept can be embodied. Normal operation of the VGT controller 133 is indicated at configuration 435. The VGT configuration 435 that is established immediately prior to a coast flag 405 being asserted is referred to herein as a current VGT configuration 435. The VGT configuration that is established immediately subsequent to a coast flag 405 being reset is referred to herein as a new VGT configuration 437. Both the current VGT configuration 435 and new VGT configuration 437 are established by normal operation of the VGT.

At some point in time, the machine operator may modulate its speed by coasting and, accordingly, a coast flag 405 may be asserted, such as by electronic control module circuitry 130. This may occur when the operator has released the throttle, e.g., accelerator pedal 154. Without the coasting feature described herein, the VGT may be configured according to configuration 410, which includes wide swings in the VGT vane positions. However, the coasting feature of the present inventive concept maintains the current VGT configuration, e.g., VGT configuration 435, throughout the coasting event as illustrated VGT configuration 415.

When coast flag 405 is made inactive, such as by the machine operator activating accelerator pedal 154, the coasting configuration 415 may be held for a debounce period tDB 420, the termination of which may cause the VGT control to return to normal operation. In certain embodiments, the VGT control may return to normal operation at a predetermined ramp rate, as illustrated at VGT configuration ramp 430. The VGT configuration ramp 430 connects VGT configuration 415 to new VGT configuration 437 for control of unwanted artefacts resulting from abrupt and/or wide-swinging transitions.

Figure 5:
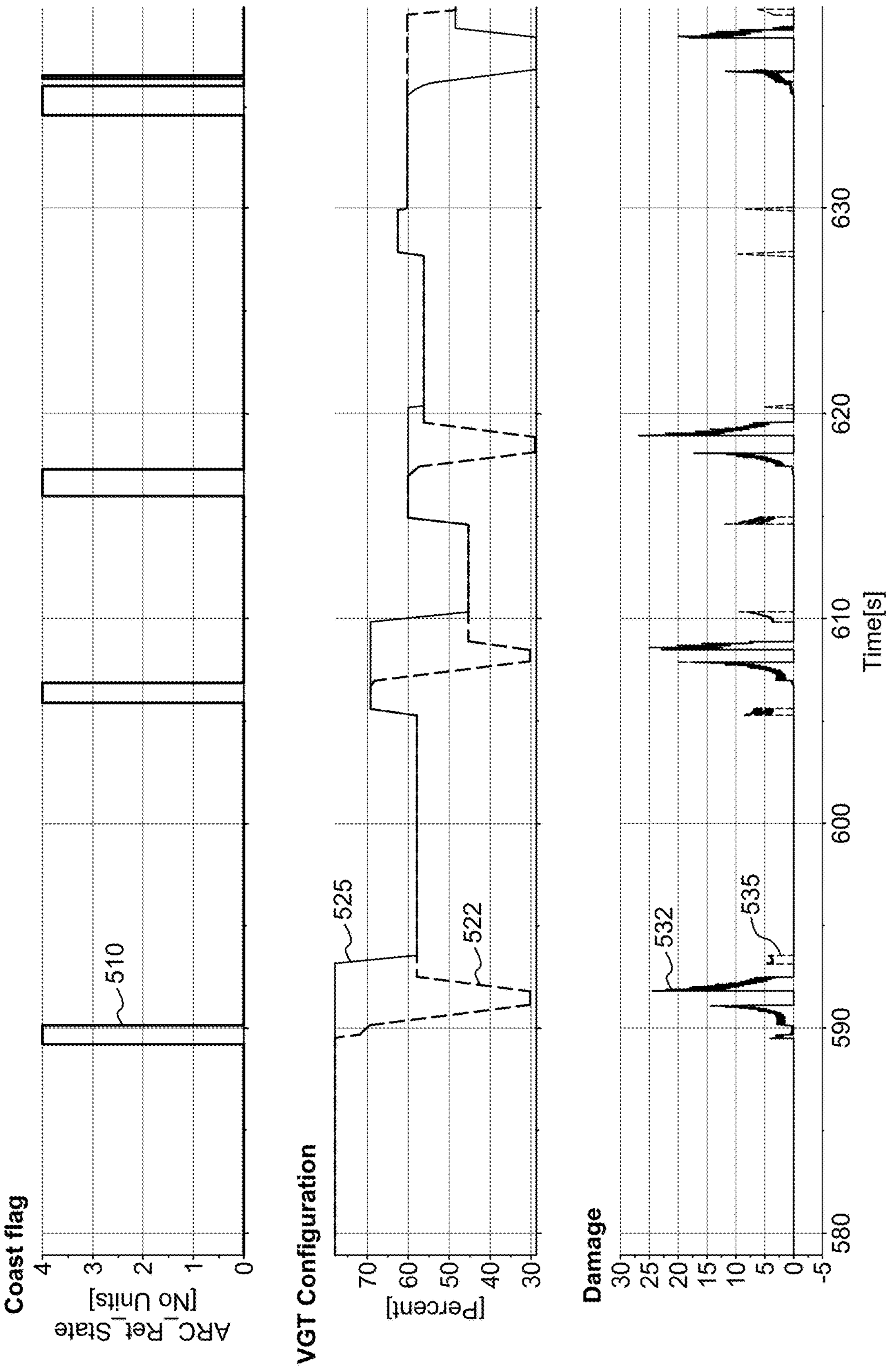
FIG. 5 is a set of graphs demonstrating an exemplary VGT coasting technique by which the present inventive concept can be embodied.

FIG. 5 is a set of graphs demonstrating an exemplary VGT coasting technique by which the present inventive concept can be embodied. The upper panel depicts a coast flag signal 510, the middle panel depicts a VGT position signal for both with (VGT position signal 525) and without (VGT position signal 522) the coasting feature applied, and the lower panel depicts a vane damage comparison between a VGT without the coasting feature and a VGT with the coasting feature of the present inventive concept. That is, the damage imparted to the VGT without the coasting feature is depicted at damage signal 532 and the damage imparted to the VGT with the coasting feature is depicted at damage signal 535. In the illustrated embodiment, the reduction in damage by implementing the coasting control of the present inventive concept may be 10%-20%.

Figure 6:
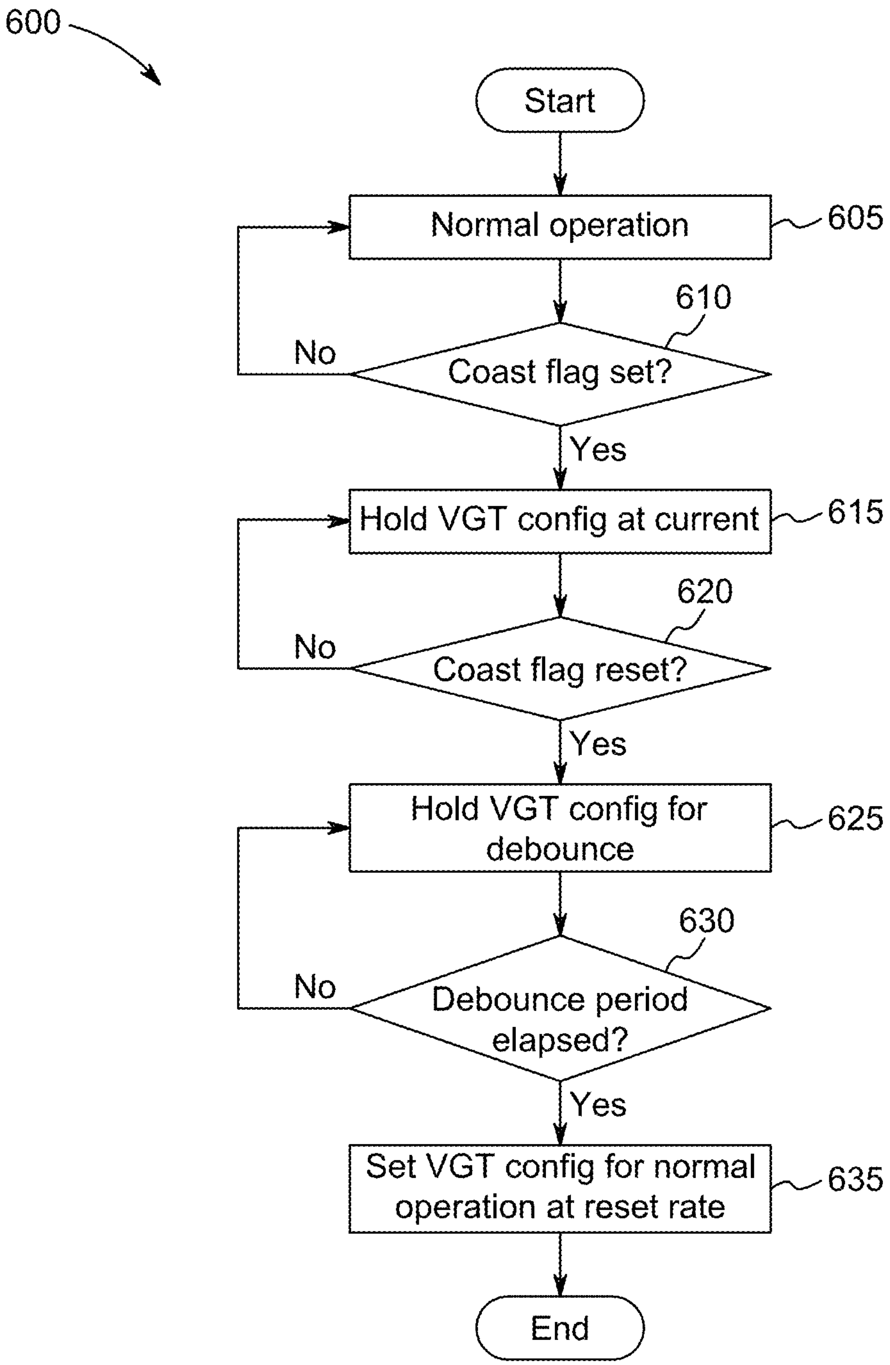
FIG. 6 is a flow diagram of an exemplary VGT control process 600. by which the present inventive concept can be embodied.

FIG. 6 is a flow chart of a method, process, operation, and/or functionally 600 according to embodiments of the disclosed subject matter. Some or all of the method 600 can be performed via a non-transitory computer-readable storage medium (or media) having stored thereon instructions that, when executed by one or more processors, causes the one or more processors to perform some or all of the method. According to one or more embodiments, the method 600 may be referred to or characterized as a method for controlling a variable geometry turbocharger (VGT). Thus, FIG. 6 is a flow diagram of an exemplary VGT control process 600 by which the present inventive concept can be embodied.

Normal operation of VGT is indicated in operation 605. In operation 610, it may be determined whether a coast flag is set. If so, process 600 may transition to operation 615, whereby a VGT configuration is held at a current VGT configuration. In operation 620, it may be determined whether the coast flag has been reset. If so, process 600 may transition to operation 625, whereby the current configuration of the VGT is held for a debounce period, e.g., 3 seconds. In operation 630, it may be determined whether the debounce period has elapsed. If so, process 600 may transition to operation 635, whereby the VGT is returned to normal operation at a reset rate, e.g., ramping to a new VGT configuration that is dictated by normal control of the VGT.

INDUSTRIAL APPLICABILITY

Machine wear can occur through friction when machine parts are in contact with and move relative to other machine parts. As the machine parts wear, there may be a corresponding loss in efficiency and machine lifetime. Lubricants are often employed to reduce friction, but certain designs, such as when retrofitting, are not equipped with a lubricating mechanism. Other techniques for reducing machine wear are then warranted where available.

Wear and other damage may be further ameliorated by reducing the motion between the machine parts. For variable geometry turbochargers (VGTs), target machine parts include displaceable vanes on the turbocharger's turbine. The vanes are set in motion by a controller to rotate the turbocharger's compressor at a particular rate for a given engine speed. The compressor speed dictates the engine intake air density. The controller may be employed to operate the VGT in a manner that reduces motion between the vanes and the VGT body wherever possible.

A machine operator may modify the ground speed of the machine by coasting, e.g., by releasing the machine's throttle (e.g., pedal-controlled throttle). Such control may cause extra VGT motions when the throttle is used to modulate vehicle speed with rapid off/on action. Generally, coasting is a short-lived event, but during the coasting, the VGT vanes may be configured from a relatively open position to a relatively closed position in a short period of time. To reduce wear, such wide swing vane motion over a short period of time can be avoided.

One or more embodiments of the present disclosure can implement a control system, method, and computer-programmed product for a variable geometry turbocharger (VGT) based vehicle to improve durability. A vehicle or transmission ECM can send a signal to an engine ECM to indicate that the vehicle is coasting. Further, the engine ECM can use this signal to disable VGT motions, for instance, responsive to an operator depressing the pedal for short times. Thus, one or more embodiments of the present disclosure can detect when the vehicle is coasting and direct the VGT to hold its configuration for a set time to avoid motions caused by rapid throttle off/on events.

Embodiments of the present inventive concept can maintain a current vane configuration over the short periods of coasting. That is, whatever vane configuration is established prior to the coasting event is maintained throughout that coasting event. Consequently, the short-lived wide swings in vane configuration can be avoided and corresponding machine wear can be reduced. The present inventive concept may be embodied to implement such a coasting technique.

According to one or more embodiments of the present disclosure, information about vehicle coasting can be utilized to identify an opportunity to suspend VGT operation. That is, according to one or more embodiments a coasting state can be used to freeze VGT motion, for instance, to improve durability of the VGT. Optionally, no "look ahead data" may be used but rather real-time data to determine a current state of the work machine.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory (ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosed subject matter can also be as set forth according to the following parentheticals.

(1.) A work machine comprising: an internal combustion engine; a variable geometry turbocharger (VGT) constructed to modulate intake air density of the internal combustion engine; andcontrol circuitry constructed to: determine the work machine is coasting without use of look-ahead data, assert a coasting flag upon a determination that the work machine is coasting, and output control signaling to maintain a current VGT vane configuration as long as the coasting flag is asserted.

(2). The work machine of (1), wherein the determination that the work machine is coasting is achieved by a null position of an accelerator control.

(3). The work machine of (1), wherein the coasting flag is asserted upon a determination that a gear threshold, a throttle threshold, a grade threshold, and a speed threshold have been met.

(4). The work machine of (1) or (3), wherein the coasting flag is held as long as the gear threshold, the throttle threshold and the grade threshold are met.

(5). The work machine of (1), wherein the current vane configuration is held through a debounce period subsequent to the coasting enable flag being reset.

(6). The work machine of (1) or (5), wherein the current vane configuration is ramped at a reset rate to meet a new vane configuration dictated by normal VGT operation.

(7). An internal combustion engine of a work machine comprising: a variable geometry turbocharger (VGT) constructed to modulate intake air density of the internal combustion engine; electronic machine control circuitry constructed to assert a coasting flag upon a determination that the work machine is coasting; and VGT control circuitry constructed to maintain a current VGT vane configuration as long as the coasting flag is asserted.

(8). The internal combustion engine of (7), wherein the determination that the work machine is coasting is achieved by a null position of an accelerator control.

(9). The internal combustion engine of (7), wherein the coasting flag is asserted upon a determination that a gear threshold, a throttle threshold, a grade threshold, and a speed threshold have been met.

(10). The internal combustion engine of (7) or (9), wherein the coasting enable flag is held as long as the gear threshold, the throttle threshold and the grade threshold are met.

(11). The internal combustion engine of (7), wherein the current vane configuration is held through a debounce period subsequent to the coasting flag being reset.

(12). The internal combustion engine of (7) or (11), wherein the current vane configuration is ramped at a reset rate to meet a new vane configuration dictated by normal VGT operation.

(13). The internal combustion engine of (7), wherein the determination that the work machine is coasting is achieved without use of look-ahead data.

(14). A method of variable geometry turbocharger (VGT) control comprising: determining, in real time, using a processor, whether a coast flag is set indicating that a work machine is coasting; holding the VGT at a current vane configuration as long as the coast flag is set; and returning the VGT to normal operation thereof upon a determination that the coast flag is reset.

(15). The method of (14), wherein returning the VGT to normal operation includes: holding the current vane configuration through a debounce period; and returning the VGT to normal operation subsequent to the debounce period.

(16). The method of (15) further comprising ramping the current vane configuration to a new vane configuration per the normal operation of the VGT subsequent to the debounce period.

(17). The method of (14) further comprising setting the coasting flag upon a determination that a gear threshold, a throttle threshold, a grade threshold, and a speed threshold have been met.

(18). The method of (14) or (17), wherein the coasting flag is held as long as the gear threshold, the throttle threshold and the grade threshold are met.

(19). The method of (14), further comprising, before said holding the VGT at the current vane configuration as long as the coasting flag is set, configuring the VGT according to the current vane configuration from a previous vane configuration.

(20). The method of (14), wherein the determination that the work machine is coasting is achieved without use of look-ahead data.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A work machine comprising:

an internal combustion engine;

a variable geometry turbocharger (VGT) having displaceable vanes; and control circuitry constructed to:

determine the work machine is coasting without use of look-ahead data, assert a coasting flag upon a determination that a gear threshold, a throttle threshold, a grade threshold, and a speed threshold have been met, and output control signaling to maintain a current VGT vane configuration as long as the coasting flag is asserted.

2. The work machine of claim 1, wherein the determination that the work machine is coasting is achieved by a null position of an accelerator control.

3. The work machine of claim 1, wherein the coasting flag is held as long as the gear threshold, the throttle threshold and the grade threshold are met.

4. The work machine of claim 1, wherein the current vane configuration is held through a debounce period subsequent to the coasting enable flag being reset.

5. The work machine of claim 4, wherein the current vane configuration is ramped at a reset rate to meet a new vane configuration dictated by normal VGT operation.

6. An internal combustion engine of a work machine comprising:

a variable geometry turbocharger (VGT) constructed to modulate intake air density of the internal combustion engine;

electronic machine control circuitry constructed to assert a coasting flag upon a determination that the work machine is coasting; and VGT control circuitry constructed to maintain a current VGT vane configuration while the coasting flag is asserted and through a debounce period subsequent to the coasting flag being reset.

7. The internal combustion engine of claim 6, wherein the determination that the work machine is coasting is achieved by a null position of an accelerator control.

8. The internal combustion engine of claim 6, wherein the current vane configuration is ramped at a reset rate to meet a new vane configuration dictated by normal VGT operation.

9. The internal combustion engine of claim 6, wherein the determination that the work machine is coasting is achieved without use of look-ahead data.

10. An internal combustion engine of a work machine comprising:

a variable geometry turbocharger (VGT) constructed to modulate intake air density of the internal combustion engine;

electronic machine control circuitry constructed to assert a coasting flag upon a determination that the work machine is coasting, the coasting flag being asserted upon a determination that a gear threshold, a throttle threshold, a grade threshold, and a speed threshold have been met; and VGT control circuitry constructed to maintain a current VGT vane configuration as long as the coasting flag is asserted.

11. The internal combustion engine of claim 10, wherein the coasting enable flag is held as long as the gear threshold, the throttle threshold and the grade threshold are met.

12. A method of variable geometry turbocharger (VGT) control comprising:

determining, in real time, using a processor, whether a coast flag is set indicating that a work machine is coasting;

holding the VGT at a current vane configuration as long as the coast flag is set; and returning the VGT to normal operation thereof upon a determination that the coast flag is reset, wherein returning the VGT to normal operation includes:

holding the current vane configuration through a debounce period; and returning the VGT to normal operation subsequent to the debounce period.

13. The method of claim 12, further comprising ramping the current vane configuration to a new vane configuration per the normal operation of the VGT subsequent to the debounce period.

14. The method of claim 12 further comprising setting the coasting flag upon a determination that a gear threshold, a throttle threshold, a grade threshold, and a speed threshold have been met.

15. The method of claim 14, wherein the coasting flag is held as long as the gear threshold, the throttle threshold and the grade threshold are met.

16. The method of claim 12, further comprising, before the holding the VGT at the current vane configuration as long as the coasting flag is set, configuring the VGT according to the current vane configuration from a previous vane configuration.

17. The method of claim 12, wherein the determination that the work machine is coasting is achieved without use of look-ahead data.

* * * * *